(12) United States Patent
Sarkis et al.

(10) Patent No.: US 11,463,144 B2
(45) Date of Patent: Oct. 4, 2022

(54) TECHNIQUES FOR REPORTING CHANNEL QUALITY INDICATORS IN WIRELESS COMMUNICATIONS

(71) Applicant: QUALCOMM Incorporated, San Diego, CA (US)

(72) Inventors: Gabi Sarkis, San Diego, CA (US); Jing Jiang, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/660,508

(22) Filed: Oct. 22, 2019

(65) Prior Publication Data
US 2020/0145077 A1    May 7, 2020

(30) Foreign Application Priority Data
Nov. 2, 2018 (GR) .............................. 20180100504

(51) Int. Cl.
*H04W 4/00* (2018.01)
*H04B 7/06* (2006.01)

(52) U.S. Cl.
CPC .................................. *H04B 7/0632* (2013.01)

(58) Field of Classification Search
None
See application file for complete search history.

(56) References Cited

U.S. PATENT DOCUMENTS

| | | | | |
|---|---|---|---|---|
| 2011/0250848 | A1* | 10/2011 | Bergljung | H04L 1/0026 455/67.11 |
| 2012/0287877 | A1* | 11/2012 | Han | H04W 52/0216 370/329 |
| 2012/0320951 | A1* | 12/2012 | Han | H04L 1/0073 375/141 |
| 2013/0294352 | A1* | 11/2013 | Park | H04W 24/10 370/328 |

(Continued)

FOREIGN PATENT DOCUMENTS

WO     2019064163 A1    4/2019

OTHER PUBLICATIONS

Huawei, et al., "Link Adaption and CSI Reporting for URLLC Transmission", 3GPP TSG RAN WG1 Meeting #91, 3GPP Draft; R1-1719412, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017 (Nov. 18, 2017), 15 Pages, XP051369321, Retrieved from the Internet: URL: http://www.3gpp.org/ftp/tsg%5Fran/WG1%5FRL1/TSGR1%5F91/Docs/ [retrieved on Nov. 18, 2017] section 3. 1. 2.

(Continued)

Primary Examiner — Clemence S Han
(74) Attorney, Agent, or Firm — Arent Fox, LLP

(57) ABSTRACT

Aspects described herein relate to determining, for a received channel, a first channel quality indicator (CQI) related to a first block error rate (BLER), determining, for the received channel, a second CQI related to a second BLER different from the first BLER, and reporting the first CQI as an absolute value and the second CQI as a relative value from the absolute value.

30 Claims, 6 Drawing Sheets

(56) References Cited

U.S. PATENT DOCUMENTS

| | | | | |
|---|---|---|---|---|
| 2013/0294393 | A1* | 11/2013 | Park | H04L 1/0026 370/329 |
| 2014/0029454 | A1* | 1/2014 | Yu | H04L 1/203 370/252 |
| 2016/0087777 | A1* | 3/2016 | Ihm | H04L 1/0026 370/252 |
| 2018/0219664 | A1* | 8/2018 | Guo | H04B 17/318 |
| 2019/0037428 | A1* | 1/2019 | Åström | H04B 7/0626 |
| 2019/0052397 | A1* | 2/2019 | Onggosanusi | H04L 1/0003 |
| 2019/0150016 | A1* | 5/2019 | Kittichokechai | H04L 1/0018 370/252 |
| 2019/0394758 | A1* | 12/2019 | Cheng | H04L 1/0061 |
| 2020/0022117 | A1* | 1/2020 | Dong | H04W 72/0453 |
| 2020/0119836 | A1* | 4/2020 | Lyu | H04L 1/0025 |
| 2020/0136763 | A1* | 4/2020 | Lee | H04L 5/0007 |
| 2020/0244320 | A1* | 7/2020 | Wang | H04B 7/0639 |
| 2020/0245333 | A1* | 7/2020 | Lin | H04L 5/0053 |
| 2020/0403679 | A1* | 12/2020 | Park | H04B 7/0486 |

OTHER PUBLICATIONS

Huawei, et al., "MCS/CQI Design for URLLC Transmission", 3GPP TSG RAN WG1 Ad Hoc Meeting, 3GPP Draft, R1-1800059, 3rd Generation Partnership Project (3GPP), Mobile Competence Centre; 650, Route Des Lucioles; F-06921 Sophia-Antipolis Cedex; France, vol. RAN WG1, No. Vancouver, Canada, Jan. 22, 2018-Jan. 26, 2018, Jan. 13, 2018 (Jan. 13, 2018), 7 Pages, XP051384562, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018] sections 2-4, section 4.1. .
Partial International Search Report—PCT/US2019/057681—ISA/EPO—dated Jan. 23, 2020.
International Search Report and Written Opinion—PCT/US2019/057681—ISA/EPO—dated Mar. 17, 2020.

* cited by examiner

TECHNIQUES FOR REPORTING CHANNEL QUALITY INDICATORS IN WIRELESS COMMUNICATIONS

CLAIM OF PRIORITY UNDER 35 U.S.C. § 119

The present application for patent claims priority to Greek Patent Application No. 20180100504, entitled "TECHNIQUES FOR REPORTING CHANNEL QUALITY INDICATORS IN WIRELESS COMMUNICATIONS" filed Nov. 2, 2018, which is assigned to the assignee hereof and hereby expressly incorporated by reference herein for all purposes.

BACKGROUND

Aspects of the present disclosure relate generally to wireless communication systems, and more particularly, to reporting channel quality indicator(s).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations, including long term evolution (LTE) and/or other fourth generation (4G), third generation (3G) technologies, etc. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In addition, devices communicating in a wireless network can report channel quality achieving multiple block error rates (BLER) by using a channel quality indicator (CQI) for each target BLER. A base station can configure the device with a CQI table for each target BLER, which can specify a CQI reporting index, a modulation to use in communicating over the corresponding channel based on the CQI, a code rate to use in communicating over the corresponding channel based on the CQI, and/or an efficiency factor achievable using the CQI. For each target BLER, the device can determine an achievable efficiency factor based on detected channel conditions, and can accordingly report a CQI index for each target BLER. The base station can use the CQI index to schedule data channels for the device (which may include determining a modulation and coding scheme (MCS) and/or set of resources to use in communicating with the device) and/or infer information about downlink control channel performance based on the CQI reported for each target BLER.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes determining, for a received channel, a first channel quality indicator (CQI) related to a first block error rate (BLER), determining, for the received channel, a second CQI related to a second BLER different from the first BLER, and reporting the first CQI as an absolute value and the second CQI as a relative value from the absolute value.

In another example, a method of wireless communication is provided. The method includes receiving, from a UE, a first CQI as an absolute value and a second CQI as a relative value from the absolute value, determining, for a channel and based on the absolute value, a first CQI related to a first BLER, and determining, for the channel and based on the relative value applied to the absolute value, a second CQI related to a second BLER different from the first BLER.

In another example, an apparatus for wireless communication is provided that includes a transceiver, a memory configured to store instructions, and one or more processors communicatively coupled with the transceiver and the memory. The one or more processors are configured to determine, for a received channel, a first channel quality indicator (CQI) related to a first block error rate (BLER), determine, for the received channel, a second CQI related to a second BLER different from the first BLER, and report the first CQI as an absolute value and the second CQI as a relative value from the absolute value.

In another example, an apparatus for wireless communication is provided that includes a transceiver, a memory configured to store instructions, and one or more processors communicatively coupled with the transceiver and the memory. The one or more processors are configured to receive, from a user equipment (UE), a first CQI as an absolute value and a second CQI as a relative value from the absolute value, determine, for a channel and based on the absolute value, the first CQI related to a first BLER, and determine, for the channel and based on the relative value applied to the absolute value, the second CQI related to a second BLER different from the first BLER.

In a further examples, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
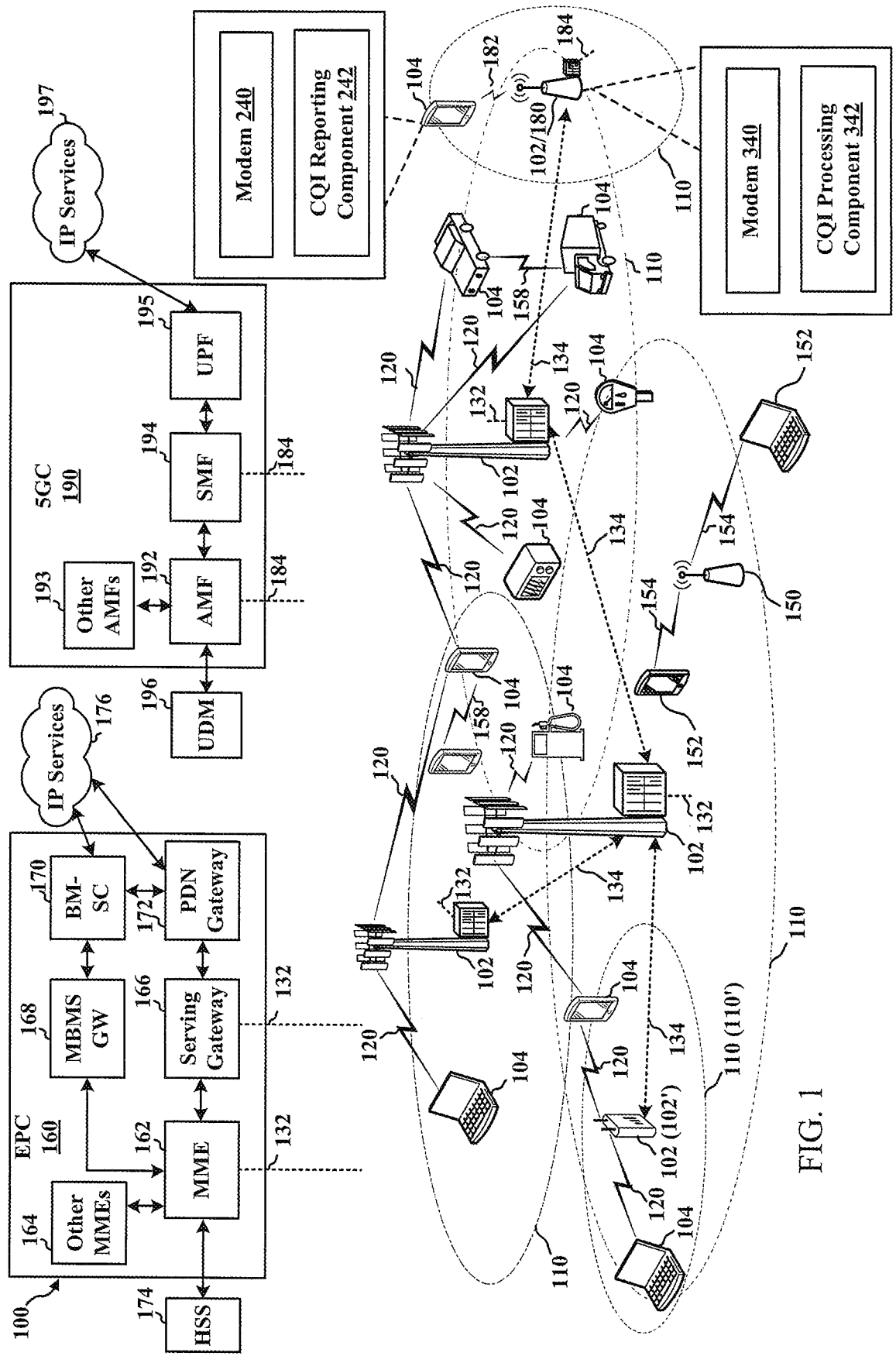
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to reporting channel quality indicator (CQI) values for multiple target block error rates (BLERs) in wireless communications. In an example, one CQI value for one BLER can be reported as an absolute value, while one or more other CQI values for one or more other BLERs can be reported as relative values based on the absolute value, which can reduce overhead in reporting the CQI values. The reported CQI values can each be a CQI index into a CQI table, where each CQI index may correspond to a different CQI table that is based on a given target BLER, in one example. The target BLERs may correspond to different traffic channels or bearers between a device reporting the CQI and a base station (or other device scheduling resources for the reporting device). For example, the traffic channels may relate to different technologies that have different tolerable failure rate (e.g., enhanced mobile broadband (eMBB) versus ultra-reliable-low latency communications (URLLC)). The target BLERs may additionally or alternatively correspond to different instances of transmission and/or retransmission of a packet or other division of data over a single channel (e.g., to improve likelihood of successful transmission in a retransmission), transmission of different types of communications that have different quality-of-service (QoS) parameters, etc.

In this regard, a device can determine multiple CQI indices related to different CQI tables, and can report the multiple CQI indices by reporting at least one of the multiple CQI indices as an absolute value and reporting the other of the multiple CQI indices as relative values that are relative to the absolute value. For example, the device can report the other of the multiple CQI indices as a reported offset from the absolute value. In one example, the device can report the reported offset based on another fixed offset between the CQI indices. Using the offset(s) in this regard may allow for using a less number of total bits used in reporting the CQI values, which can reduce overhead in reporting the CQI values. In one example, this may be useful in lessening overhead to comply with throughput requirements of some wireless communication technologies, such as URLLC.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein, and thus functionalities and components described herein with respect to a base station 102 can be similarly implemented and/or otherwise provided by a gNB 180. In one example, some nodes of the wireless communication system may have a modem 240 and CQI reporting component 242 for reporting values for multiple CQIs, and some nodes may have a modem 340 and a CQI processing component 342 for receiving and/or processing CQI reports from one or more other devices, as described herein. Though a UE 104 is shown as having the modem 240 and CQI reporting component 242 and a base station 102 is shown as having the modem 340 and CQI processing component 342, this is one illustrative example, and substantially any node or type of node may include a modem 240 and CQI reporting component 242 and/or a modem 340 and CQI processing component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, CQI reporting component 242 can report CQI or other channel quality metrics for a channel, and can report multiple CQIs for, or otherwise related to, multiple target BLERs. For example, CQI reporting component 242 can use one or more offsets in reporting the multiple CQIs to decrease overhead typically associated with the reporting. In addition, CQI processing component 342 can receive and process the multiple CQIs based on the one or more offsets. Additionally, for example, CQI processing component 342 may configure the one or more UEs 104 to report the multiple CQIs using the one or more offsets. Further examples of CQI reporting, processing, and/or configuration are described herein.

Figure 2:
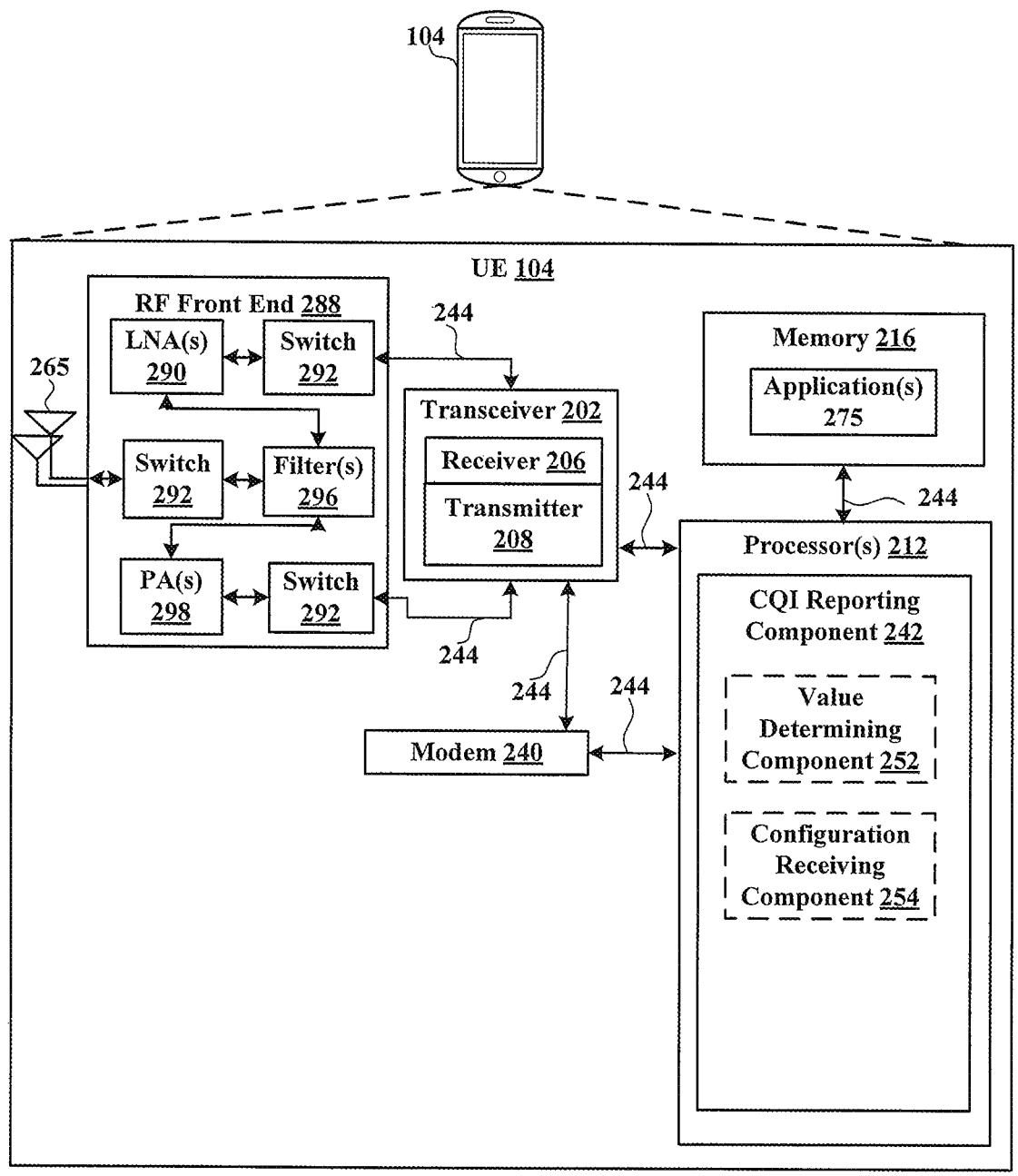
FIG. 2 is a block diagram illustrating an example of a UE, in accordance with various aspects of the present disclosure.
Figure 3:
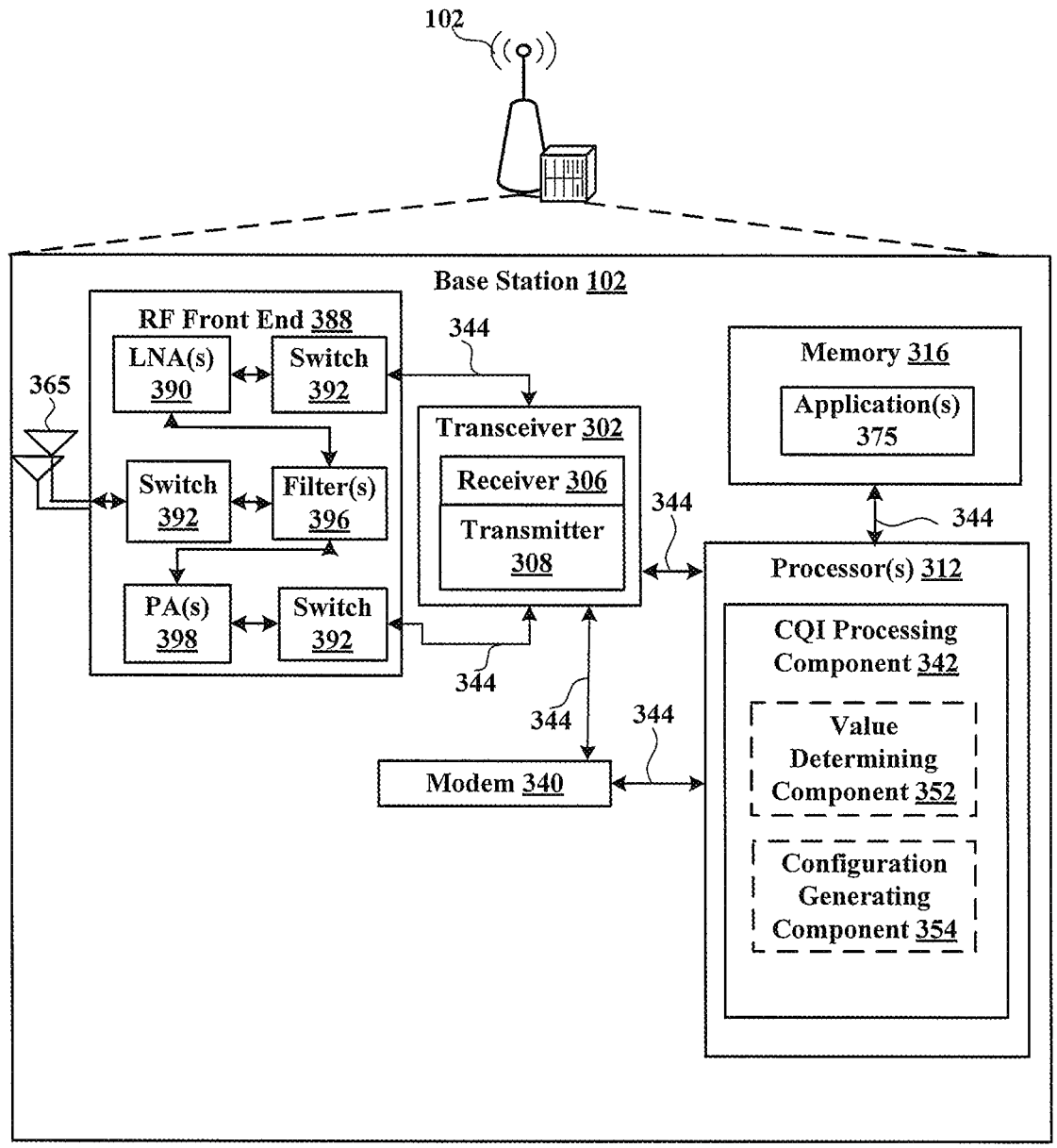
FIG. 3 is a block diagram illustrating an example of a base station, in accordance with various aspects of the present disclosure.
Figure 4:
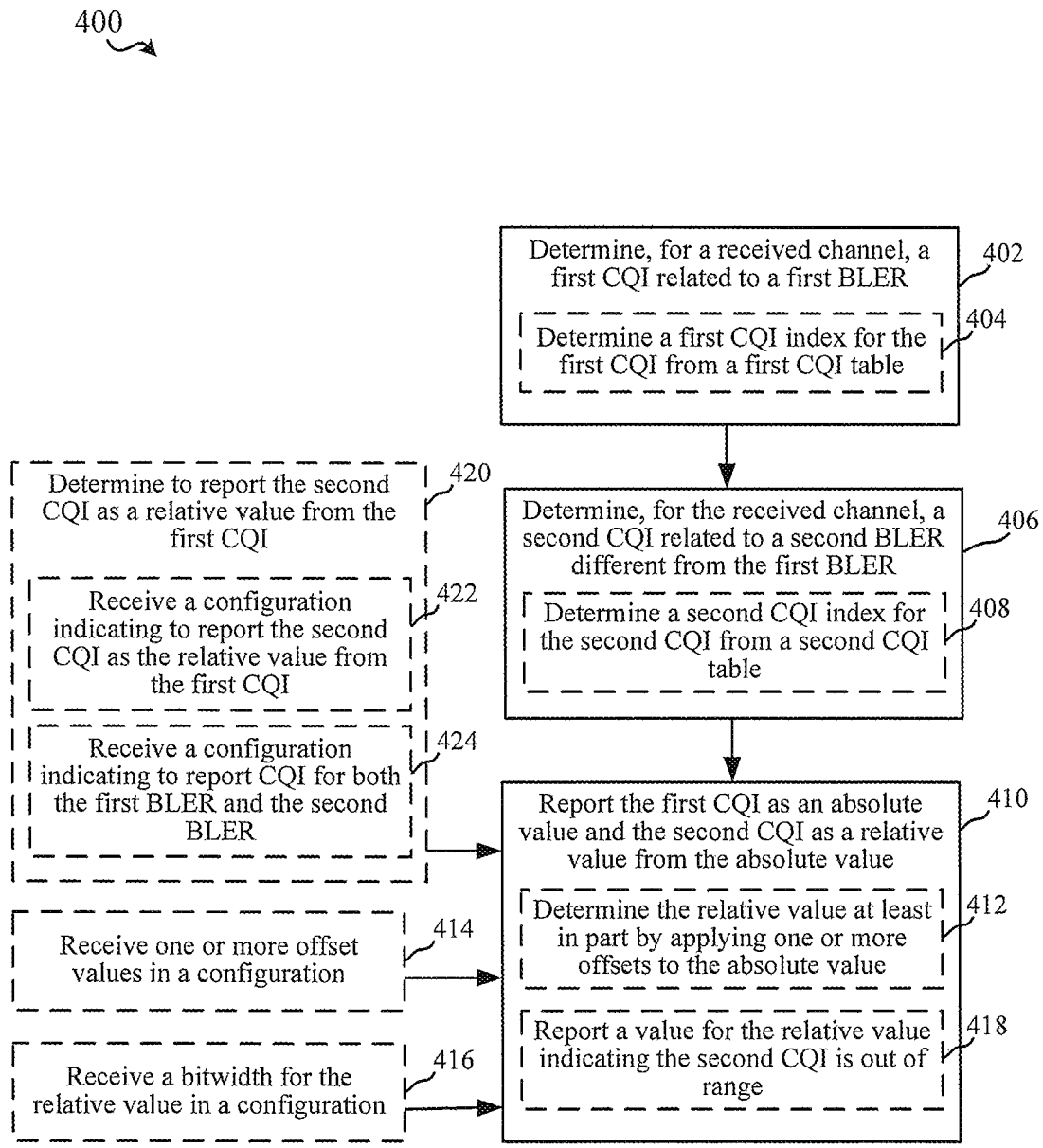
FIG. 4 is a flow chart illustrating an example of a method for reporting channel quality indicators (CQI), in accordance with various aspects of the present disclosure.
Figure 5:
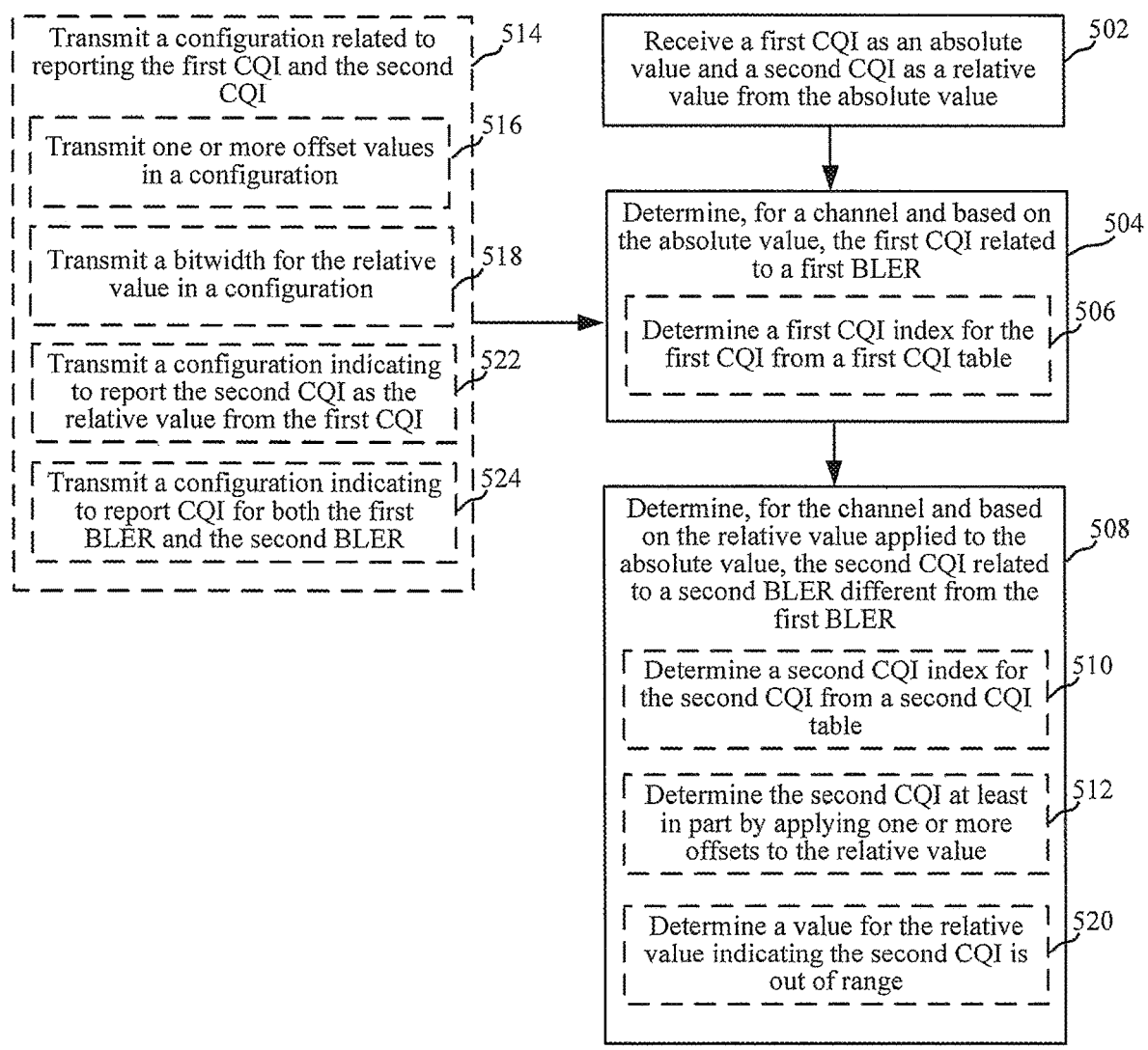
FIG. 5 is a flow chart illustrating an example of a method for processing reported CQIs, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or CQI reporting component 242 to enable reporting of CQI values related to each of multiple target BLERs.

In an aspect, the one or more processors 212 can include a modem 240 and/or can be part of the modem 240 that uses one or more modem processors. Thus, the various functions related to CQI reporting component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with CQI reporting component 242 may be performed by transceiver 202.

Also, memory 216 may be configured to store data used herein and/or local versions of applications 275 or CQI reporting component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining CQI reporting component 242 and/or one or more of its subcomponents, and/or data associated therewith, when UE 104 is operating at least one processor 212 to execute CQI reporting component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, CQI reporting component 242 can optionally include a value determining component 252 for determining one or more values to indicate CQI, and/or a configuration receiving component 254 for obtaining and/or processing a configuration for determining and/or reporting the one or more values to indicate CQI.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and CQI processing component 342 for processing CQI for multiple target BLERs.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, CQI processing component 342 can optionally include a value determining component 352 for determining CQI from values received in a CQI report from one or more other devices, and/or a configuration generating component 354 for generating and/or transmitting a configuration indicating one or more parameters for reporting CQI using one or more offset values.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for reporting CQI for multiple BLER targets. In an example, a UE 104 can perform the functions described in method 400 using one or more of the components described in FIGS. 1-2.

In method 400, at Block 402, a first CQI related to a first BLER can be determined for a received channel. In an aspect, value determining component 252, e.g., in conjunction with processor(s) 212, memory 216, transceiver 202, CQI reporting component 242, etc., can determine, for the received channel, the first CQI related to the first BLER. For example, the received channel may correspond to a downlink channel received from the base station 102. Value determining component 262 can determine the first CQI to report for the received channel based on a corresponding target BLER, based on one or more detected channel conditions (e.g., signal-to-noise ratio (SNR), signal-to-interference-and-noise ratio (SINR), received signal strength indicator (RSSI), reference signal received power (RSRP), reference signal received quality (RSRQ), etc.), and/or the like. In one example, based on the detected channel condition(s), value determining component 262 may determine a CQI value that can be used to achieve the target BLER.

In a specific example, in determining the first CQI at Block 402, optionally at Block 404, a first CQI index for the first CQI can be determined from a first CQI table. In an aspect, value determining component 252, e.g., in conjunction with processor(s) 212, memory 216, transceiver 202, CQI reporting component 242, etc., can determine the first CQI index for the first CQI from the first CQI table. For example, the first CQI table may relate to a target BLER, and may include a list of CQI indices (e.g., 0-15), where each CQI index can be associated with a modulation type (e.g., quadrature phase shift keying (QPSK), 16-quadrature amplitude modulation (QAM), 64-QAM, etc.), code rate, efficiency factor, etc. In this example, based on the CQI table, value determining component 252 can determine a CQI index to report to achieve the target BLER based on the efficiency factor, the channel conditions, etc. One specific example of a CQI table is shown below in Table 1, which can correspond to a BLER target=1e-1:

TABLE 1

| CQI Index | Modulation | Code Rate x 1024 | Efficiency |
|---|---|---|---|
| 0 | | Out of range | |
| 1 | QPSK | 78 | 0.1523 |

TABLE 1-continued

| CQI Index | Modulation | Code Rate x 1024 | Efficiency |
|---|---|---|---|
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In this example, value determining component 252 can determine the CQI index from the CQI table to report to the base station 102 for the received channel. In an example, CQI reporting component 242 can obtain this table from a configuration stored in memory 216 and/or otherwise obtained from base station 102 and/or another network component to use in reporting CQI for BLER target=0.1. For example, CQI reporting component 242 may obtain a radio resource control (RRC) configuration specifying the CQI table relating to the target BLER, and CQI reporting component 242 can accordingly determine to report CQI for the target BLER.

In method 400, at Block 406, a second CQI related to a second BLER can be determined for the received channel. In an aspect, value determining component 252, e.g., in conjunction with processor(s) 212, memory 216, transceiver 202, CQI reporting component 242, etc., can determine, for the received channel, the second CQI related to the second BLER. Value determining component 262 can determine the second CQI to report for the received channel based on a corresponding target BLER, based on the detected channel conditions, etc., as described above. In one example, based on the detected channel conditions, value determining component 262 may determine a CQI value that can be used to achieve the second target BLER.

In a specific example, in determining the second CQI at Block 406, optionally at Block 408, a second CQI index for the second CQI can be determined from a second CQI table. In an aspect, value determining component 252, e.g., in conjunction with processor(s) 212, memory 216, transceiver 202, CQI reporting component 242, etc., can determine the second CQI index for the second CQI from the second CQI table. For example, the second CQI table may relate to a different target BLER, and may include a list of CQI indices (e.g., 0-15), where each CQI index can be associated with a modulation type, code rate, efficiency factor, etc. In this example, based on the CQI table, value determining component 252 can determine a CQI index to report to achieve the second target BLER based on the efficiency factor, the channel conditions, etc. Another specific example of a CQI table for a different target BLER is shown below in Table 2, which can correspond to a BLER target=1e-5:

TABLE 2

| CQI Index | Modulation | Code Rate x 1024 | Efficiency |
|---|---|---|---|
| 0 | | Out of range | |
| 1 | QPSK | 30 | 0.0586 |
| 2 | QPSK | 50 | 0.0977 |
| 3 | QPSK | 78 | 0.1523 |

TABLE 2-continued

| CQI Index | Modulation | Code Rate x 1024 | Efficiency |
|---|---|---|---|
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

In this example, value determining component 252 can determine the second CQI index from the second CQI table to report to the base station 102 for the received channel. In an example, CQI reporting component 242 can also obtain this second table from a configuration stored in memory 216 and/or otherwise obtained from base station 102 and/or another network component to use in reporting CQI for BLER target=1e−5. For example, CQI reporting component 242 may obtain a RRC configuration specifying the CQI table relating to the target BLER, and CQI reporting component 242 can accordingly determine to additionally report CQI for this target BLER.

In method 400, at Block 410, the first CQI can be reported as an absolute value and the second CQI can be reported as a relative value from the absolute value. In an aspect, CQI reporting component 242, e.g., in conjunction with processor(s) 212, memory 216, transceiver 202, etc., can report (e.g., by transmitting the report to a base station 102) the first CQI as the absolute value and the second CQI as the relative value from the absolute value. For example, in CQI reporting component 242 can transmit a report indicating both values (or separate reports) to the base station 102 using an assigned control channel (e.g., physical uplink control channel (PUCCH)), shared channel (e.g., physical uplink shared channel (PUSCH)), etc.

For example, this can allow CQI reporting component 242 to use a less number of total bits in reporting the CQI, where the relative value can be a value of a difference, from the absolute value. The value of the difference can be smaller (e.g., both in value and/or size) than a second absolute value of the second CQI. In the example described above, the CQI value can relate to a CQI index in a CQI table. In this example, value determining component 252 can determine the relative value for reporting the second CQI as an offset of the second CQI index from the first CQI index. Thus, for example, CQI reporting component 242 can report the first CQI as a 4-bit absolute value from Table 1 above (e.g., a value from 0-15), and can report the second CQI as an offset from the absolute value, which can use a smaller bitwidth (a less number of bits) than the 4-bit absolute value. For example, if it is assumed that the difference in values is never more than four (and is not negative), a 2-bit value can be used to indicate the relative value, as opposed to another 4-bit value to indicate the absolute value. Specifically, for target BLERs, a lower BLER target may use a lower efficiency. Thus, where the absolute value for the first CQI corresponds to a lower BLER target, using CQI tables as described above, the relative value for a higher BLER target can typically be a positive offset. Similarly, where the absolute value for the first CQI corresponds to a higher BLER target, using CQI tables as described above, the relative value for a lower BLER target can typically be a negative offset. In any case, bits to differentiate positive and negative values may not be needed.

Moreover, for example, CQI reporting component 242 may report the CQIs using a single report including both values to additionally conserve communication resources. For example, CQI reporting component 242 may transmit a single channel state information (CSI) report to the base station 102 indicating both values, as opposed to using separate CSI reports for each CQI. As described further herein, using one or more additional offsets may increase the likelihood that the relative value uses a less number of bits.

For example, in reporting the CQI values at Block 410, optionally at Block 412, the relative value can be determined at least in part by applying one or more offsets to the absolute value. In an aspect, value determining component 252, e.g., in conjunction with processor(s) 212, memory 216, transceiver 202, CQI reporting component 242, etc., can determine the relative value at least in part by applying one or more offsets to the absolute value. For example, value determining component 252 may apply a fixed offset in determining the relative value, where the first offset may more closely align the first and second CQIs, such that the second absolute value (the second CQI) can be determined from the first absolute value (the first CQI), the first offset, and the relative value.

Using the CQI table example above, Table 1 and Table 2 may have similar CQI properties for indices that are offset by 2. For example, efficiency 0.1523 corresponds to CQI index 1 in Table 1 above, and to CQI index 3 in Table 2 above. Thus, at least in this specific example, value determining component 252 can apply an offset of 2 to the relative value for reporting (and/or subsequently determining or processing) the second CQI. Where the CQIs correspond to similar efficiency factors, this may allow for using an even less number of bits. For example, desirably, the CQI indices to report for the target BLERs in this example can be similar (e.g., CQI index 1 for Table 1 and CQI index 3 or 4 for Table 3). Using the additional fixed offset may allow value determining component 252 to determine the relative value as 0 or 1, which can be reported in 1 bit, for example (e.g., as opposed to 4 bits for the full CQI index of Table 2).

In the specific CQI table example above, the general form to derive one CQI from another can be $CQI_{10^{-5}} = CQI_{10^{-1}} + \Delta - d$, where $CQI_{10^{-5}}$ is the absolute value of the CQI index for target BLER=1e−5, $CQI_{10^{-1}}$ is the absolute value for the CQI index for target BLER=1e−1, $\Delta$ is the fixed offset between the CQI indices in the CQI tables, as described, and d is the relative offset to report. Thus, for example:

$$CQI_{10^{-5}} = \max(\min(CQI_{10^{-1}} + \Delta, 15) - d, 0)$$

$$CQI_{10^{-1}} = \min(\max(CQI_{10^{-5}} - \Delta, 0) + d, 15)$$

In this example, value determining component 252 can determine and report one absolute CQI index and d for determining the other CQI index. Accordingly, base station 102 can determine the CQI indices, as described further herein, by determining one absolute CQI index from the report, and compute the other absolute CQI index based on the determined absolute CQI index, A, and the reported relative value, d, using the above formulas. In other words, CQI reporting component 242, in this example, can report either $CQI_{10^{-5}}$ and d, which can be used to deduce $CQI_{10^{-1}}$, or can report $CQI_{10^{-1}}$ and d, which can be used to deduce $CQI_{10^{-5}}$.

In an example, the fixed offset A, if used, can be received in a configuration (e.g., a configuration stored in memory 216, received in RRC signaling from the base station 102, etc.). In another example, the fixed offset A, if used, can be determined based on the configured CQI tables (e.g., determined as or based on a difference in CQI indices corresponding to similar efficiencies across the CQI tables). For example, offset values can be configured for various configurations of BLER targets, such as in a mapping of two or more configured BLER targets to an associated fixed offset, and thus in one example, CQI reporting component 242 may determine the fixed offset based on the mapping and on configured BLER targets. In any case, in method 400, optionally at Block 414, the one or more offset values can be received in a configuration. In an aspect, configuration receiving component 254, e.g., in conjunction with processor(s) 212, memory 216, transceiver 202, CQI reporting component 242, etc., can receive the one or more offset values in the configuration. For example, configuration receiving component 254 can receive the configuration from the base station 102 (e.g., in RRC signaling) or otherwise and/or CQI reporting component 242 can determine the one or more offset values from one or more parameters in the configuration (e.g., from the BLER tables or known target BLER values). The base station 102 can configure the offset value semi-statically (e.g., as a global value or per CSI report). In another example, CQI reporting component 242 may use a fixed offset for all cases, which can be stored as a parameter in memory 216.

In another example, in method 400, optionally at Block 416, a bitwidth for the relative value can be received in a configuration. In an aspect, configuration receiving component 254, e.g., in conjunction with processor(s) 212, memory 216, transceiver 202, etc., can receive the bitwidth for the relative value in the configuration. In this regard, CQI reporting component 242 can appropriately generate signaling for reporting the relative value based on the bitwidth. In addition, value determining component 252 may use the configured bitwidth to determine whether to report the out of range value CQI value (e.g., CQI index 0 in the tables above) for the relative value. For example, one of the possible values within the bitwidth may be reserved for reporting out of range (e.g., 0, a max value, etc.). In addition, in this regard, in reporting the CQI values at Block 410, optionally at Block 418, a value for the relative value indicating the second CQI is out of range from the first CQI can be reported. In an aspect, CQI reporting component 242, e.g., in conjunction with processor(s) 212, memory 216, transceiver 202, etc., can report the value for the relative value indicating the second CQI is out of range (e.g., where the determined relative value is larger than the highest number that can be represented using the configured bitwidth).

In yet another example, CQI reporting component 242 may report the second CQI as a relative value in certain scenarios (e.g., but perhaps not in other scenarios, in which case CQI reporting component 242 may separately report, or refrain from reporting, the second CQI). Thus, in method 400, optionally at Block 420, it can be determined to report the second CQI as a relative value from the first CQI. In an aspect, CQI reporting component 242, e.g., in conjunction with processor(s) 212, memory 216, transceiver 202, etc., can determine whether to report the second CQI as a relative value from the first CQI. In one example, CQI reporting component 242 can determine to always report the higher BLER using the absolute value and the lower BLER using a relative value, and/or vice versa. In another example, optionally at Block 422, a configuration can be received indicating to report the second CQI as the relative value from the first CQI. In an aspect, configuration receiving component 254, e.g., in conjunction with processor(s) 212, memory 216, transceiver 202, etc., can receive the configuration indicating to report the second CQI as the relative value from the first CQI. For example, configuration receiving component 254 can receive the configuration from the base station 102 (e.g., in RRC signaling) with one or more parameters indicating to report the second CQI as the relative value, and CQI reporting component 242 can accordingly report the second CQI as the relative value, as described herein. The one or more parameters may additionally or alternatively indicate a fixed offset to use in determining the relative value, the bitwidth for the relative value, the value to indicate out of range for the relative value, etc.

The one or more parameters may additionally or alternatively indicate which CQI (or associated target BLER) corresponds to the first CQI (e.g., the CQI for which an absolute value is reported) and/or which CQI (or associated target BLER) corresponds to the second CQI (e.g., the CQI for which a relative value from the absolute value is reported). This may be an explicit indication or may be tied to other parameters (e.g., a processing timeline capability). For example, for processing timeline capability 2, CQI reporting component 242 can determine to report the lower BLER target using the absolute value and the higher BLER target using the relative value, or for processing timeline capability 1, CQI reporting component 242 can determine to report the higher BLER target using the absolute value and the lower BLER target using the relative value, etc. For example, processing timeline capability 1 can be a first processing timeline capability defined for a wireless communication technology and processing timeline capability 2 can be a second processing timeline capability that is different from processing timeline capability 1 (e.g., a faster timeline than processing timeline capability 1). A specific example of processing timeline capabilities 1 and 2 can be those defined in third generation partnership project (3GPP) technical specification (TS) 38.214, Section 5.3.

In another example, in determining to report the second CQI as a relative value at Block 420, optionally at Block 424, a configuration can be received indicating to report CQI for both the first BLER and the second BLER. In an aspect, configuration receiving component 254, e.g., in conjunction with processor(s) 212, memory 216, transceiver 202, etc., can receive the configuration indicating to report CQI for both the first BLER and the second BLER. For example, this can be the configuration indicating the two target BLER CQI tables, and based on receiving the configuration, CQI reporting component 242 can determine to report the second CQI as a relative value. In one example, CQI reporting component 242 can determine to report the second CQI as a relative value where the configuration indicates to report the first and second CQI in the same CSI report and/or where separate reporting configurations for the first and second CQIs collide on uplink resources (e.g., are configured over the same or similar uplink resources).

Though CQI reporting aspects are described above for two CQIs, two target BLERs, etc., similar concepts can be applied for reporting additional CQIs. For example, one CQI can use absolute value, and multiple other CQIs can be relative values from the absolute values, which may be based on different fixed offset values corresponding to the target BLER (and the target BLER for the absolute value), etc. Moreover, though concepts are described above for reporting CQI, BLER, etc. for a single channel, similar concepts can be applied for reporting CQI, BLER, etc. for multiple channels (e.g., a first BLER for the first channel as an absolute value, along with a second BLER for the second channel as a relative value relative to the absolute value).

FIG. 5 illustrates a flow chart of an example of a method 500 for processing multiple received CQI values. In an example, a base station 102 can perform the functions described in method 500 using one or more of the components described in FIGS. 1 and 3.

In method 500, at Block 502, a first CQI as an absolute value and a second CQI as a relative value from the absolute value can be received. In an aspect, CQI processing component 342, e.g., in conjunction with processor(s) 312, memory 316, transceiver 302, etc., can receive (e.g., in a report from a UE 104) the first CQI as an absolute value and the second CQI as a relative value from the absolute value. As described, for example, CQI processing component 342 can receive the first and second CQIs in a single CSI report from the UE 104 or in multiple CSI reports. In one example, CQI processing component 342 may receive the report(s) over a control channel or shared channel configured for the UE 104 (e.g., PUCCH, PUSCH, etc.). As described, for example, the CQI report(s) and/or related values, can relate to different target BLERs.

In method 500, at Block 504, the first CQI related to a first BLER can be determined for a channel and based on the absolute value. In an aspect, value determining component 352, e.g., in conjunction with processor(s) 312, memory 316, transceiver 302, CQI processing component 342, etc., can determine, for the channel and based on the absolute value, a first CQI related to the first BLER. For example, the absolute value can indicate the actual first CQI determined by the UE 104. In one example, in determining the first CQI at Block 504, optionally at Block 506, a first CQI index for the first CQI from a first table can be determined. In an aspect, value determining component 352, e.g., in conjunction with processor(s) 312, memory 316, transceiver 302, CQI processing component 342, etc., can determine the first CQI index for the first CQI from the first CQI table. As described, for example, the reported CQI can correspond to a CQI index (e.g., a value 0-15) in a CQI table related to the first BLER (e.g., Table 1 above). In this regard, CQI processing component 342 can determine the first CQI based on determining parameters in the CQI table, of the first BLER, corresponding to the first CQI index.

In method 500, at Block 508, the second CQI related to a second BLER different from the first BLER can be determined for the channel and based on the relative value applied to the absolute value. In an aspect, CQI processing component 342, e.g., in conjunction with processor(s) 312, memory 316, transceiver 302, etc., can determine, for the channel and based on the relative value applied to the absolute value, the second CQI related to the second BLER different from the first BLER. For example, CQI processing component 342 can apply the relative value by adding or subtracting the relative value to/from the absolute value to determine the second CQI. With the CQIs determined, for example, the base station 102 can determine a MCS to apply for transmitting communications to the UE 104 over the channel, where the MCS can be applied based on the target BLER to be achieved. For example, the base station 102 can apply the MCS determined based on one CQI (e.g., for the lower BLER) for an initial transmission, and can apply the MCS determined based on the other CQI (e.g., for the higher BLER) for a retransmission of the initial transmission.

In determining the second CQI at Block 508, optionally at Block 510, a second CQI index for the second CQI from a second CQI table can be determined. In an aspect, value determining component 352, e.g., in conjunction with processor(s) 312, memory 316, transceiver 302, CQI processing component 342, etc., can determine the second CQI index for the second CQI from the second CQI table. For example, applying the relative value to the absolute value may result in another CQI index (the second CQI) index into a second CQI table related to the second BLER (e.g., Table 2 in the above examples). In this example, using the relative value can allow for receiving the report using a less number of total bits than if both CQIs were absolute values. Value determining component 352, however, can determine the absolute value for the second CQI based on the relative value and the absolute value for the first CQI, as described.

In determining the second CQI at Block 508, optionally at Block 512, the second CQI can be determined at least in part by applying one or more offsets to the relative value. In an aspect, value determining component 352, e.g., in conjunction with processor(s) 312, memory 316, transceiver 302, CQI processing component 342, etc., can determine the second CQI at least in part by applying the one or more offsets to the relative value. As described, the one or more offsets can include a fixed offset (e.g., Δ in the above examples). For example, the fixed offset may be the same value for each report, may be configured (e.g., by the base station 102) for each report, may be related to, and/or configured for, the first and second BLERs or their corresponding CQI tables, etc. In an example, value determining component 352 can apply the offset and relative value to the absolute value of the first CQI using the formulas described above to determine the absolute value for the second CQI.

As described, for example, the CQI processing component 342 can use the first and/or second CQI(s) in scheduling communications for the UE 104 (e.g., shared channel communications, such as over a physical downlink shared channel (PDSCH)), to infer channel conditions for a downlink control channel (e.g., a physical downlink control (PDCCH)), and/or the like. In scheduling communications, in one example, CQI processing component 342 can use the first CQI for a first target BLER in scheduling initial instances of transmissions and/or the second CQI for a second target BLER in scheduling retransmission instances of the transmissions, etc. In another example, CQI processing component 342 can use the first CQI for scheduling certain types of communications (e.g., eMBB communications), while using the second CQI for scheduling other types of communications (e.g., URLLC communications).

In an example, in method 500, optionally at Block 514, a configuration related to reporting the first CQI and the second CQI can be transmitted. In an aspect, configuration generating component 354, e.g., in conjunction with processor(s) 312, memory 316, transceiver 302, CQI processing component 342, etc., can transmit the configuration related to reporting the first CQI and the second CQI. For example, configuration generating component 354 can transmit the configuration (e.g., or one or more configurations) using RRC signaling, in configuring a CSI reporting event, etc.

In transmitting the configuration at Block 514, optionally at Block 516, one or more offset values can be transmitted in the configuration. In an aspect, configuration generating component 354, e.g., in conjunction with processor(s) 312, memory 316, transceiver 302, CQI processing component 342, etc., can transmit the one or more offset values in the configuration. For example, configuration generating component 354 can transmit a fixed offset value for all reporting or for a given CSI reporting, a list of offset values for sets of BLERs for which CQI is to be reported, etc.

In transmitting the configuration at Block 514, optionally at Block 518, a bitwidth for the relative value can be transmitted in the configuration. In an aspect, configuration generating component 354, e.g., in conjunction with processor(s) 312, memory 316, transceiver 302, CQI processing component 342, etc., can transmit the bitwidth for the relative value in the configuration. As described, configuration generating component 354 can transmit the bitwidth for all reportings or for a given CSI reporting, a bitwidth for sets of BLERs for which CQI is to be reported, etc. This can allow the UE 104 to properly report the relative value in the bitwidth.

In this example, in determining the second CQI at Block 508, optionally at Block 520, a value for the relative value indicating the second CQI is out of range can be determined. In an aspect, value determining component 352, e.g., in conjunction with processor(s) 312, memory 316, transceiver 302, CQI processing component 342, etc., can determine the value for the relative value as indicating the second CQI is out of range. This value can be a reserved value (e.g., 0, max value, etc.) and/or can be configured in the configuration generated by configuration generating component 354. In this example, CQI processing component 342 can refrain from determining and/or processing the second CQI value, and/or can configure the UE 104 with another mechanism for reporting the second CQI value (e.g., configure a larger bitwidth, request the second CQI value as an absolute value, and/or the like).

In addition, in transmitting the configuration at Block 514, optionally at Block 522, a configuration indicating to report the second CQI as the relative value from the first CQI can be transmitted. In an aspect, configuration generating component 354, e.g., in conjunction with processor(s) 312, memory 316, transceiver 302, CQI processing component 342, etc., can transmit the configuration indicating to report the second CQI value as the relative value from the first CQI. For example, configuration generating component 354 can transmit the configuration to indicate CQI tables and/or corresponding target BLERs. In another example, configuration generating component 354 can transmit the configuration to indicate for which BLER the UE 104 is to report CQI using the absolute value and/or for which BLER the UE 104 is to report CQI using the relative value. In this example, the configuration may explicitly indicate the BLERs or may indicate a rule for determining for which BLER to report using absolute value (e.g., a rule indicating to use absolute value for higher BLER). In another example, configuration generating component 354 can transmit the configuration to indicate one or more other parameters, such as the fixed offset, a mapping of fixed offsets, the bitwidth, the out of range value, etc., as described. This can enable the UE 104 to report the CQIs using absolute and relative values, as described.

In addition, in transmitting the configuration at Block 514, optionally at Block 524, a configuration indicating to report CQI for both the first BLER and the second BLER can be transmitted. In an aspect, configuration generating component 354, e.g., in conjunction with processor(s) 312, memory 316, transceiver 302, CQI processing component 342, etc., can transmit the configuration indicating to report CQI for both the first BLER and the second BLER. For example, configuration generating component 354 can transmit a configuration indicating to report both CQIs in a single CSI reporting opportunity, which can cause the UE 104 to report absolute and relative values, as described.

Figure 6:
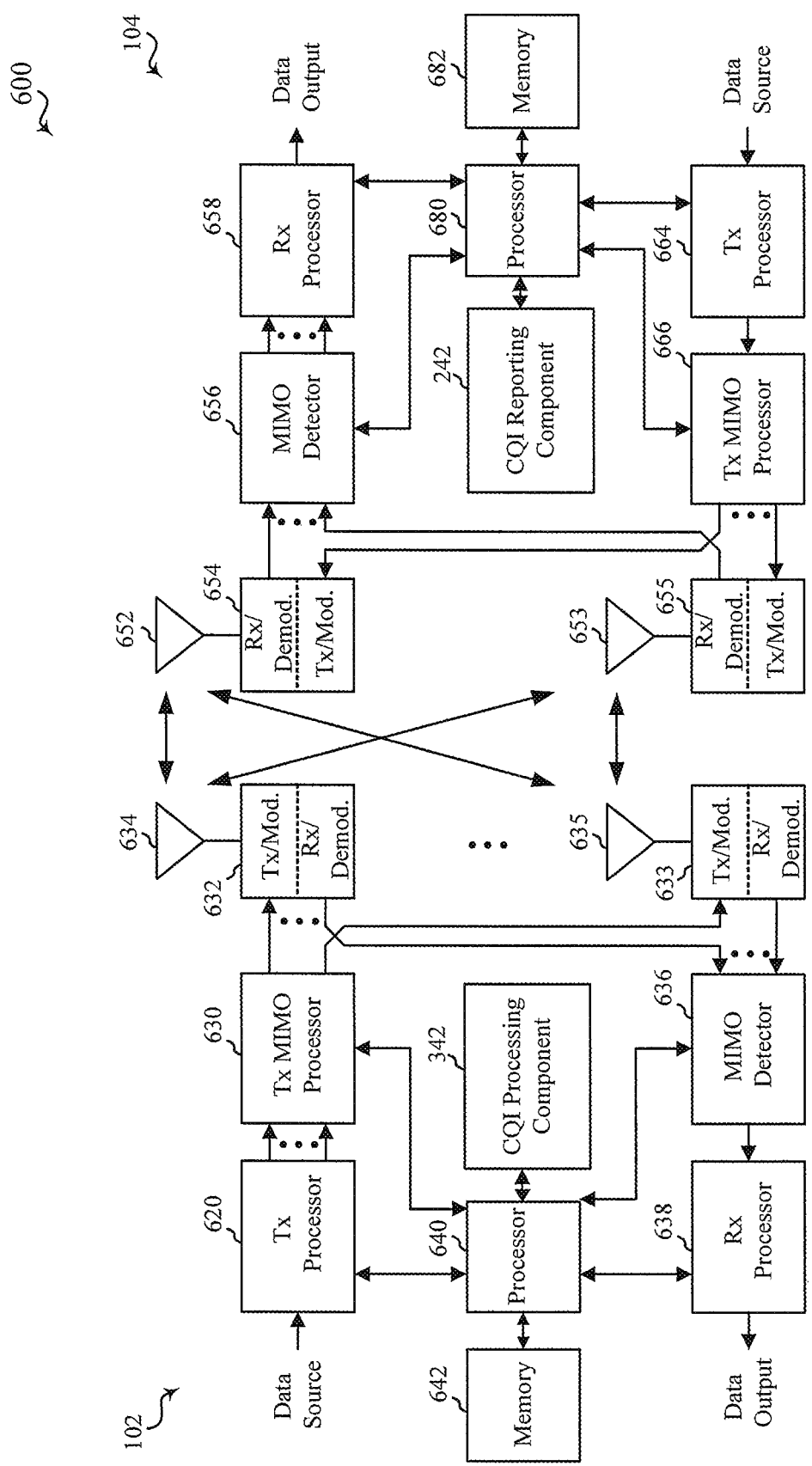
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a CQI reporting component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a CQI processing component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
    determining, for a received channel, a first channel quality indicator (CQI) related to a first block error rate (BLER);
    determining, for the received channel, a second CQI related to a second BLER different from the first BLER; and
    reporting the first CQI as an absolute value and the second CQI as a relative value from the absolute value.

2. The method of example 1, wherein determining the first CQI comprises determining a first index of the first CQI in a first CQI table related to the first BLER, wherein determining the second CQI comprises determining a second index of the second CQI in a second CQI table related to the second BLER, and wherein reporting the first CQI and the second CQI comprises reporting the first index as the absolute value and the second index as the relative value from the absolute value.
3. The method of example 2, wherein the first index is of a first number of bits, and wherein the second index is of a second number of bits that is less than the first number of bits.
4. The method of any of examples 2 or 3, wherein reporting the second index as the relative value includes applying an offset value to the first index.
5. The method of example 4, wherein the offset value correlates at least a first portion of indices from the first CQI table with at least a second portion of indices from the second CQI table relating to the same CQI values.
6. The method of any of examples 4 or 5, wherein the offset value correlates at least a first portion of indices from the first CQI table with at least a second portion of indices from the second CQI table relating to lower CQI values, wherein the first BLER is higher than the second BLER.
7. The method of any of examples 4 to 6, further comprising receiving the offset value in a configuration from an access point.
8. The method of any of examples 1 to 7, further comprising receiving a bitwidth of the relative value in a configuration from an access point.
9. The method of any of examples 1 to 8, wherein reporting the second CQI comprises reporting a value of the relative value to indicate the second CQI is out of range from the first CQI.
10. The method of any of examples 1 to 9, further comprising receiving, in a configuration from an access point, an indication to report both of the first CQI and the second CQI, wherein reporting the first CQI and the second CQI is based at least in part on receiving the configuration.
11. The method of example 10, wherein the receiving the configuration indicates to report CQI for both of the first BLER and the second BLER.
12. The method of any of examples 1 to 11, wherein reporting the first CQI and the second CQI is based on determining that two channel state information reports, requested by an access point, collide on uplink resources.
13. The method of any of examples 1 to 12, wherein reporting the first CQI as the absolute value and the second CQI as the relative value is based at least in part on determining which of multiple BLERs is the first BLER and which of the multiple BLERs is the second BLER.
14. The method of example 13, wherein determining which of multiple BLERs is the first BLER and which of the multiple BLERs is the second BLER comprises determining a higher BLER as the first BLER and a lower BLER as the second BLER.
15. The method of any of examples 13 or 14, wherein determining which of multiple BLERs is the first BLER and which of the multiple BLERs is the second BLER comprises receiving, from an access point, a configuration indicating the first BLER and the second BLER.
16. The method of any of examples 13 or 15, wherein determining which of multiple BLERs is the first BLER and which of the multiple BLERs is the second BLER is based at least in part on a configured reporting timeline.

17. A method for wireless communication, comprising:
receiving, from a user equipment (UE), a first channel quality indicator (CQI) as an absolute value and a second CQI as a relative value from the absolute value;
determining, for a channel and based on the absolute value, the first CQI related to a first block error rate (BLER); and
determining, for the channel and based on the relative value applied to the absolute value, the second CQI related to a second BLER different from the first BLER.
18. The method of example 17, wherein receiving the first CQI and the second CQI comprises receiving a first index as the absolute value and a second index as the relative value from the absolute value, wherein determining the first CQI comprises determining, from the first index, the first CQI in a first CQI table related to the first BLER, and wherein determining the second CQI comprises determining, from the second index, the second CQI in a second CQI table related to the second BLER.
19. The method of example 18, wherein the first index is of a first number of bits, and wherein the second index is of a second number of bits that is less than the first number of bits.
20. The method of any of examples 18 or 19, further comprising determining the second index as the relative value based at least in part on applying an offset value to the first index.
21. The method of example 20, wherein the offset value correlates at least a first portion of indices from the first CQI table with at least a second portion of indices from the second CQI table relating to the same CQI values.
22. The method of any of examples 20 or 21, wherein the offset value correlates at least a first portion of indices from the first CQI table with at least a second portion of indices from the second CQI table relating to lower CQI values, wherein the first BLER is higher than the second BLER.
23. The method of any of examples 20 to 22, further comprising transmitting, in a configuration to a UE, the offset value.
24. The method of any of examples 17 to 23, further comprising transmitting, in a configuration to a UE, a bitwidth for the relative value.
25. The method of claim 17, wherein receiving the second CQI comprises receiving a value of the relative value indicating that the second CQI is out of range from the first CQI.
26. The method of any of examples 17 to 24, further comprising transmitting, in a configuration to a UE, an indication to report both of the first CQI and the second CQI, wherein receiving the first CQI and the second CQI is based at least in part on the configuration.
27. The method of example 26, wherein the configuration indicates to report CQI for both of the first BLER and the second BLER.
28. The method of any of examples 17 to 27, further comprising transmitting, in a configuration to a UE, an indication of the first BLER and the second BLER.
29. An apparatus for wireless communication, comprising:
a transceiver;
a memory configured to store instructions; and
one or more processors communicatively coupled with the transceiver and the memory, wherein the one or more processors are configured to perform the methods in any of examples 1 to 28.

30. An apparatus comprising means for performing the methods in any of examples 1 to 28.
31. A computer-readable medium, comprising code executable by one or more processors to perform the operations of the methods in any of examples 1 to 28.

What is claimed is:

1. A method for wireless communication, comprising:
determining, for a received channel, a first channel quality indicator (CQI) related to a first block error rate (BLER);
determining, for the received channel, a second CQI related to a second BLER different from the first BLER;
receiving, from an access point, a reporting indication indicating which one of first BLER CQI or second BLER CQI to report as a value relative to the other; and
reporting, based on the reporting indication, the first CQI as an absolute value and the second CQI as a relative value from the absolute value.

2. The method of claim 1, wherein determining the first CQI comprises determining a first index of the first CQI in a first CQI table related to the first BLER, wherein determining the second CQI comprises determining a second index of the second CQI in a second CQI table related to the second BLER, and wherein reporting the first CQI and the second CQI comprises reporting the first index as the absolute value and the second index as the relative value from the absolute value.

3. The method of claim 2, wherein the first index is of a first number of bits, and wherein the second index is of a second number of bits that is less than the first number of bits.

4. The method of claim 2, wherein reporting the second index as the relative value includes applying an offset value to the first index.

5. The method of claim 4, wherein the offset value correlates at least a first portion of indices from the first CQI table with at least a second portion of indices from the second CQI table relating to the same CQI values.

6. The method of claim 4, wherein the offset value correlates at least a first portion of indices from the first CQI table with at least a second portion of indices from the second CQI table relating to lower CQI values, wherein the first BLER is higher than the second BLER.

7. The method of claim 4, further comprising receiving the offset value in a configuration from an access point.

8. The method of claim 1, further comprising receiving a bitwidth of the relative value in a configuration from an access point.

9. The method of claim 1, wherein reporting the second CQI comprises reporting a value of the relative value to indicate the second CQI is out of range from the first CQI.

10. The method of claim 1, further comprising receiving, in a configuration from an access point, an indication to report both of the first CQI and the second CQI, wherein reporting the first CQI and the second CQI is based at least in part on receiving the configuration.

11. The method of claim 10, wherein the receiving the configuration indicates to report CQI for both of the first BLER and the second BLER.

12. The method of claim 1, wherein reporting the first CQI and the second CQI is based on determining that two channel state information reports, requested by an access point, collide on uplink resources.

13. The method of claim 1, wherein reporting the first CQI as the absolute value and the second CQI as the relative value is based at least in part on determining which of multiple BLERs is the first BLER and which of the multiple BLERs is the second BLER.

14. The method of claim 13, wherein determining which of multiple BLERs is the first BLER and which of the multiple BLERs is the second BLER comprises determining a higher BLER as the first BLER and a lower BLER as the second BLER.

15. The method of claim 13, wherein receiving the indication includes receiving, from the access point, the indication in a configuration in radio resource control (RRC) signaling.

16. The method of claim 13, wherein determining which of multiple BLERs is the first BLER and which of the multiple BLERs is the second BLER is based at least in part on a configured reporting timeline.

17. A method for wireless communication, comprising:
transmitting, to a user equipment (UE), a reporting indication indicating which one of first BLER channel quality indicator (CQI) or second BLER CQI to report as a value relative to the other;
receiving, from the UE, a first CQI as an absolute value and a second CQI as a relative value from the absolute value;
determining, for a channel and based on the absolute value and the reporting indication, the first CQI related to a first block error rate (BLER); and
determining, for the channel and based on the relative value applied to the absolute value and the reporting indication, the second CQI related to a second BLER different from the first BLER.

18. The method of claim 17, wherein receiving the first CQI and the second CQI comprises receiving a first index as the absolute value and a second index as the relative value from the absolute value, wherein determining the first CQI comprises determining, from the first index, the first CQI in a first CQI table related to the first BLER, and wherein determining the second CQI comprises determining, from the second index, the second CQI in a second CQI table related to the second BLER.

19. The method of claim 18, wherein the first index is of a first number of bits, and wherein the second index is of a second number of bits that is less than the first number of bits.

20. The method of claim 18, further comprising determining the second index as the relative value based at least in part on applying an offset value to the first index.

21. The method of claim 20, wherein the offset value correlates at least a first portion of indices from the first CQI table with at least a second portion of indices from the second CQI table relating to the same CQI values.

22. The method of claim 20, wherein the offset value correlates at least a first portion of indices from the first CQI table with at least a second portion of indices from the second CQI table relating to lower CQI values, wherein the first BLER is higher than the second BLER.

23. The method of claim 20, further comprising transmitting, in a configuration to a UE, the offset value.

24. The method of claim 17, further comprising transmitting, in a configuration to a UE, a bitwidth for the relative value.

25. The method of claim 17, wherein receiving the second CQI comprises receiving a value of the relative value indicating that the second CQI is out of range from the first CQI.

26. The method of claim 17, further comprising transmitting, in a configuration to a UE, an indication to report both of the first CQI and the second CQI, wherein receiving the first CQI and the second CQI is based at least in part on the configuration.

27. The method of claim 26, wherein the configuration indicates to report CQI for both of the first BLER and the second BLER.

28. The method of claim 17, further comprising transmitting, in a configuration to a UE, an indication of the first BLER and the second BLER.

29. An apparatus for wireless communication, comprising:
    a transceiver;
    a memory configured to store instructions; and
    one or more processors communicatively coupled with the transceiver and the memory, wherein the one or more processors are configured to:
        determine, for a received channel, a first channel quality indicator (CQI) related to a first block error rate (BLER);
        determine, for the received channel, a second CQI related to a second BLER different from the first BLER;
        receive, from an access point, a reporting indication indicating which of first BLER CQI or second BLER CQI to report as a value relative to the other; and
        report, based on the reporting indication, the first CQI as an absolute value and the second CQI as a relative value from the absolute value.

30. An apparatus for wireless communication, comprising:
    a transceiver;
    a memory configured to store instructions; and
    one or more processors communicatively coupled with the transceiver and the memory, wherein the one or more processors are configured to:
        transmit, to a user equipment (UE), a reporting indication indicating which of first BLER channel quality indicator (CQI) or second BLER CQI to report as a value relative to the other;
        receive, from the UE, a first CQI as an absolute value and a second CQI as a relative value from the absolute value;
        determine, for a channel and based on the absolute value and the reporting indication, the first CQI related to a first block error rate (BLER); and
        determine, for the channel and based on the relative value applied to the absolute value and the reporting indication, the second CQI related to a second BLER different from the first BLER.

* * * * *